United States Patent
Mehrseresht et al.

(10) Patent No.: US 10,565,454 B2
(45) Date of Patent: Feb. 18, 2020

(54) IMAGING SYSTEM AND METHOD FOR CLASSIFYING A CONCEPT TYPE IN VIDEO

(71) Applicant: CANON KABUSHIKI KAISHA, Tokyo (JP)

(72) Inventors: Nagita Mehrseresht, Pennant Hills (AU); Barry James Drake, Thornleigh (AU)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 15/384,104

(22) Filed: Dec. 19, 2016

(65) Prior Publication Data

US 2017/0177943 A1    Jun. 22, 2017

(30) Foreign Application Priority Data

Dec. 21, 2015 (AU) ................................. 2015271975

(51) Int. Cl.
*G06K 9/00* (2006.01)
*G06T 7/246* (2017.01)
*G06K 9/46* (2006.01)
*G06K 9/62* (2006.01)

(52) U.S. Cl.
CPC .......... *G06K 9/00718* (2013.01); *G06K 9/46* (2013.01); *G06K 9/6297* (2013.01); *G06T 7/248* (2017.01); *G06K 2009/00738* (2013.01); *G06T 2207/10016* (2013.01)

(58) Field of Classification Search
CPC .... G06K 9/00718; G06K 9/46; G06K 9/6297; G06K 2009/00738; G06T 7/248; G06T 2207/10016

See application file for complete search history.

(56) References Cited

U.S. PATENT DOCUMENTS

| | | | |
|---|---|---|---|
| 6,516,090 B1* | 2/2003 | Lennon | G06K 9/68 358/538 |
| 2015/0286853 A1* | 10/2015 | Shapovalova | G06K 9/0061 382/103 |
| 2016/0227228 A1* | 8/2016 | Pomeroy | H04N 9/8227 |

OTHER PUBLICATIONS

Lan, et al., "Discriminative Latent Models for Recognizing Contextual Group Activities", IEEE Transactions on Pattern Analysis and Machine Intelligence, Aug. 2012, vol. 34, No. 8, pp. 1549-1562.

(Continued)

*Primary Examiner* — Austin Hicks
(74) *Attorney, Agent, or Firm* — Canon U.S.A., Inc. IP Division

(57) ABSTRACT

A method and associated imaging system for classifying at least one concept type in a video segment is disclosed. The method associates an object concept type in the video segment with a spatio-temporal segment of the video segment. The method then associates a plurality of action concept types with the spatio-temporal segment, where each action concept type of the plurality of action concept types is associated with a subset of the spatio-temporal segment associated with the object concept type. The method then classifies the action concept types and the object concept types associated with the video segment using a conditional Markov random field (CRF) model where the CRF model is structured with the plurality of action concept types being independent and indirectly linked via a global concept type assigned to the video segment, and the object concept type is linked to the global concept type.

15 Claims, 9 Drawing Sheets

(56) References Cited

OTHER PUBLICATIONS

Tang, et al., "Learning latent temporal structure for complex event detection", In Computer Vision and Pattern Recognition (CVPR), IEEE Conference on, IEEE, CVF: Jun. 2012; pp. 1250-1257.

Kuehne, et al., "The Language of Actions: Recovering the Syntax and Semantics of Goal-Directed Human Activities", Proceedings from CVPR, 2014.

* cited by examiner

IMAGING SYSTEM AND METHOD FOR CLASSIFYING A CONCEPT TYPE IN VIDEO

The present application claims priority from Australian provisional patent application AU2015271975 filed on 21 Dec. 2015, the specification of which is hereby incorporated herein in its entirety.

TECHNICAL FIELD

The present invention generally relates to an imaging system and method for classifying a concept type in video.

BACKGROUND

Classification (also called categorisation) is the task of assigning an input to a certain group (also called class or category). The output of classification is the label of the group that the input has been assigned to. The assignment of an input to a class is generally based on certain characteristics of the input which are called features. When classes are formed based on some ontology, the classification provides semantic understanding. Semantic classes are often arranged into a hierarchical structure. For example, a taxonomy is a set of classes arranged in a tree structure.

In one approach to a classification, a label of each test instance (e.g., a video or a segment of a video) is determined independently of labels of all other test instances. However, such an approach fails to exploit logical or statistical inter-dependencies between labels of multiple instances, resulting in reduced classification accuracy. Classification approaches that exploit logical or statistical interdependencies are called joint classifications. Structured classification is another term commonly used for joint classification.

In machine learning, a probabilistic classifier is a classifier that is able to provide, given a sample input, a probability distribution over a set of predicted classes. Probabilistic classifiers represent a classification task as a random variable (e.g., Y) and the result of a classification process (i.e., the label inferred for a test instance) is the value of the random variable; e.g. Y=y means the outcome of classification, modelled as Y, is the state (i.e., label) y. A probabilistic classifier may be considered as a conditional distribution $P(Y|x)$, meaning that for a given input $x \in X$, a probability is assigned to each $y \in Y$. A classification method may use a probabilistic classifier to determine a classification by choosing the label, y, which the probabilistic classifier assigns the highest conditional probability. This is known as the maximum a posteriori (MAP) solution to the joint probabilistic model. The MAP solution to a probabilistic model is a state (y*) that maximises the posterior probability distribution (Y|x); i.e., $y^* = \operatorname{argmax}_y P(Y=y|x)$. The variable x is often called observed variable or feature.

In one approach, probabilistic joint classification is performed using a probabilistic graphical model. A probabilistic graphical model is a probabilistic model for which a graph expresses the conditional interdependencies between random variables. Types of probabilistic graphical models include Bayesian networks and Markov networks, also called Markov Random fields (MRF). An MRF conditioned on the value of observed variables is called a conditional Markov random field (CRF). The distinction between CRF models and MRF models is that a CRF model is conditioned on an input observed variable while an MRF is not. Once all input observed variables of a CRF model are accounted for, the CRF model is an MRF model. For that reason, this disclosure makes no distinction between a CRF model and an MRF model. Thus any use of the term MRF is understood to mean CRF or MRF.

A Bayesian network is a directed acyclic probabilistic graphical model which represents a set of random variables and their conditional dependencies via a directed acyclic graph. Bayesian networks that model sequences of random variables are called dynamic Bayesian networks (DBN). DBNs are used for time sequence modelling and temporal pattern recognition such as speech, handwriting, gesture and action recognition. Hidden Markov models (HMM) is a simple and common form of DBN. Common DBN models such as HMM and 2 time slice Bayesian networks (2TBN) are first order Markov models, meaning that they model a predicted state of a system at time t, conditioned on an understood state of the system at a previous time t−1. Adding higher order temporal dependencies (which go beyond the previous time slice) makes the inferencing of a DBN model intractable. A classification of a static concept must remain the same over time. The use of static concepts imposes long-term temporal constraints that cannot be efficiently incorporated into a DBN model.

An MRF consists of an undirected graph in which the nodes represent random variables, and the edges represent interdependencies between random variables. The interdependencies are represented as 'potential functions'. To construct a MRF model, the number of random variables and the corresponding observed feature values must be known prior to the use of the MRF model. MRF models capture interdependencies between labels of multiple instances, but the interdependences are undirected (e.g., non-causal). For example, in computer vision, MRF models are used in object detection to capture correlation between labels of objects in an image.

A solution space of an MRF model consists of all possible states of a probabilistic model of the MRF model, each state being a combination of possible classification labels for each random variable of the MRF model. A solution space of an MRF model grows exponentially as the number of variables increases. Thus, using an exhaustive search for MAP inferencing is intractable when the number of variables is not small. However, efficient exact inference algorithms exist for tree-structured MRF models and for binary MRF models that have so called 'submodular' potential functions. Markov random fields can represent arbitrary interdependences among random variables. Designing an MRF model, however, generally requires making decisions that trade-off across (i) having a simple model, (ii) having higher order interdependencies, and (iii) having additional interdependencies. Having a simple model may lead to inaccuracies in inferred classifications. Having higher order interdependencies or additional interdependencies may require cycles in the graph which may lead to the inferencing time to be too long or necessitate the use of an approximate inferencing method. An approximate inferencing method may be fast but may be too inaccurate. In general, approximate MAP inference of an MRF model with densely connected random variables has significantly higher computational cost compared to an efficient MAP inferencing algorithm for an MRF model with tree or a chain structured graph of connections.

Known methods do not teach how to construct a probabilistic model of one or more time sequences so that the model may be used to, efficiently and accurately, jointly infer classifications for static concepts and dynamic concepts. One modelling approach is to disregard the temporal dependency of dynamic concepts and instead to jointly model a snapshot of a time sequence and thus ignore interdependencies between snapshots. This modelling approach may lead to lower accuracy as it disregards temporal interdependencies of classifications in a time sequence.

Thus, there exists a need for accurate classification of static and dynamic concepts in a video which accounts for temporal and non-temporal interdependencies while enabling efficient and accurate inference.

SUMMARY

It is an object of the present invention to substantially overcome, or at least ameliorate, one or more disadvantages of existing arrangements.

The present disclosure provides arrangements that enable rich semantic understanding and efficient joint recognition and classification of static and dynamic concepts in a video using a probabilistic graphical model. In particular, the present disclosure includes a method and system for performing such joint probabilistic inferencing.

According to a first aspect, the present disclosure provides a method for classifying at least one concept type in a video segment, the method comprising: associating an object concept type in the video segment with a spatio-temporal segment of the video segment; associating a plurality of action concept types with the spatio-temporal segment, each action concept type of the plurality of action concept types being associated with a subset of the spatio-temporal segment associated with the object concept type; and classifying the action concept types and the object concept types associated with the video segment using a conditional Markov random field (CRF) model where the CRF model is structured with the plurality of action concept types being independent and indirectly linked via a global concept type assigned to the video segment, and the object concept type being linked to the global concept type.

According to a second aspect, the present disclosure provides imaging system for classifying at least one concept type in a video segment, the imaging system comprising a processor arranged to: associate an object concept type in the video segment with a spatio-temporal segment of the video segment; associate a plurality of action concept types with the spatio-temporal segment, each action concept type of the plurality of action concept types being associated with a subset of the spatio-temporal segment associated with the object concept type; and classify the action concept types and the object concept types associated with the video segment using a conditional Markov random field (CRF) model where the CRF model is structured with the plurality of action concept types being independent and indirectly linked via a global concept type assigned to the video segment, and the object concept type being linked to the global concept type.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
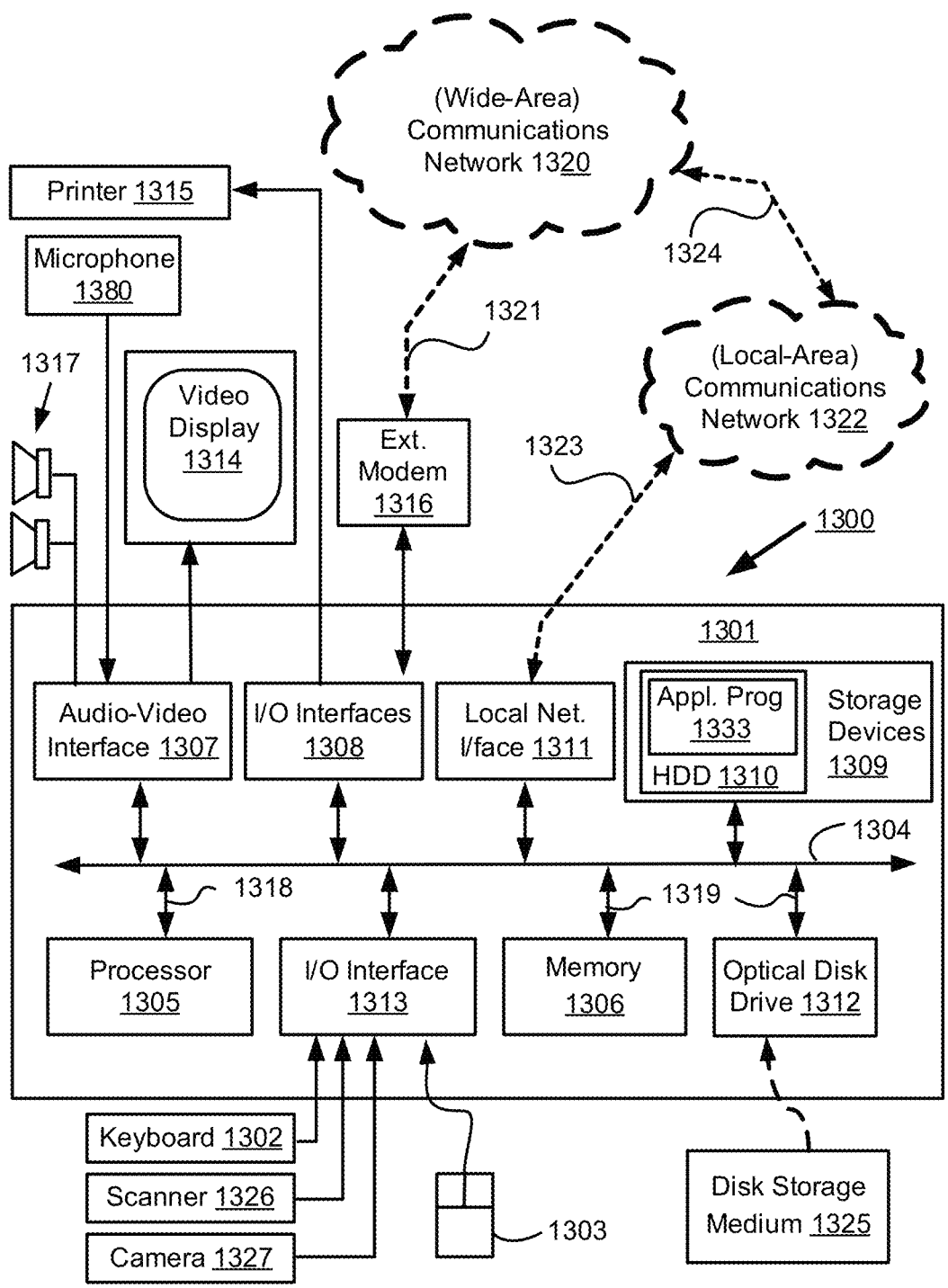
FIGS. 1A and 1B form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

In this disclosure, the term 'concept type' is used to refer to the label of a high level class which refers to a broad semantic category. In particular, 'object concept' refers to a high-level object class which is the root to all fine level object classes such as 'chair', 'ball', 'car' and 'person', and object concept type is the label of such high level class. 'Action concept' refers to a high level action class which includes all action classes such as 'walking', 'running' and 'eating'. Similarly, action concept type is the label of such class. 'Event concept' refers to a high level event class which identifies a categorisation of the class of the event which is captured in a video, and includes classes such as 'wedding ceremony', 'soccer game' and 'birthday party'. Similarly a scene concept is a high level scene class which categorises the physical location captured in the video and includes classes such as 'kitchen', 'church' and 'sport field'. In this disclosure 'global concept' refers to the union of event concept and scene concept. Global concept classification is associated with the whole video segment.

This disclosure, also considers two higher level categories of 'static concept' and 'dynamic concept'. A static concept is a concept which does not change over the temporal duration of a video. An example of a static concept is an object concept. A dynamic concept is a concept which varies over time. Examples of dynamic concepts are action, pose and facial expression concepts. An object belonging to the 'person' category remains as such over the duration of a video (an example of a static concept) but may perform different actions at different time intervals (an example of a dynamic concept). A dynamic concept is often represented as a time sequence. A system that provides rich semantic understanding of videos classifies an input video into classes across multiple concepts, and localises those classes by finding the corresponding spatio-temporal segments.

Detection refers to a combination of classification and localisation.

The embodiments described in this disclosure jointly detect objects, actions and a global classification (e.g., of a type event concept or scene concept) for an input video.

The present disclosure relates to rich semantic understanding of static and dynamic concepts in videos, and in particular efficient joint recognition and classification of these static and dynamic concepts. The described arrangements may be used to analyse a video sequence or a segment of a video sequence to generate a global concept classification jointly with i) classification and localisation for the type of object(s) in the scene and classification and ii) localisation for the type of the action(s) associated with the object(s). For the purpose of this disclosure the following terms are defined.

The term 'video segment' is used to refer to the whole or part of a recording of an event or scene as a set of images with temporal ordering.

The term 'localisation of an object' refers to associating the object classification label to a set of regions, such as bounding boxes that enclose an image of the object.

The term 'classification information' refers to information of an object or action class label.

The term 'localisation of an action' refers to associating an action to an object involved in the action, e.g. 'walking' is assigned to the localisation of a 'person' who performed the action of 'walking', and localising in time the action, e.g., by identifying the video frames associated with the start and the end of the action.

The term 'global concept classification information' refers to information that is a class label which either pertains to an event concept or a scene concept.

In one example, the described arrangements are used to analyse and semantically tag a video in an archive, for example in a video retrieval system. In another example, a live video feed is analysed and semantically tagged with a delay of a few seconds.

Figure 1B:
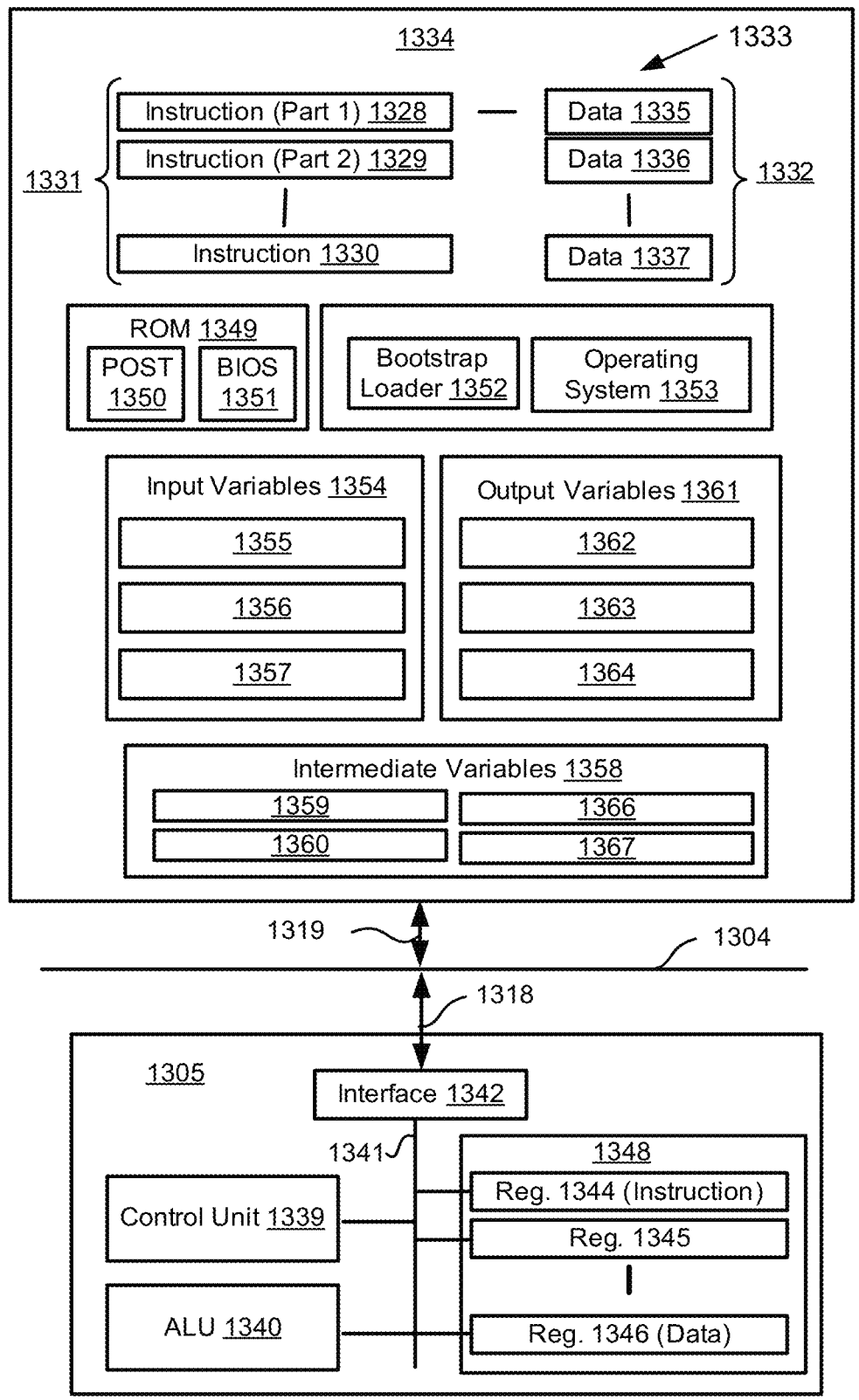

FIGS. 1A and 1B depict a general-purpose computer system 1300, upon which the various arrangements described can be practiced.

As seen in FIG. 1A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 1A, the local communications network 1322 may also couple to the wide network 1320 via a connection 1324, which would typically include a so-called "firewall" device or device of similar functionality. The local network interface 1311 may comprise an Ethernet circuit card, a Bluetooth® wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or like computer systems.

Figure 4:
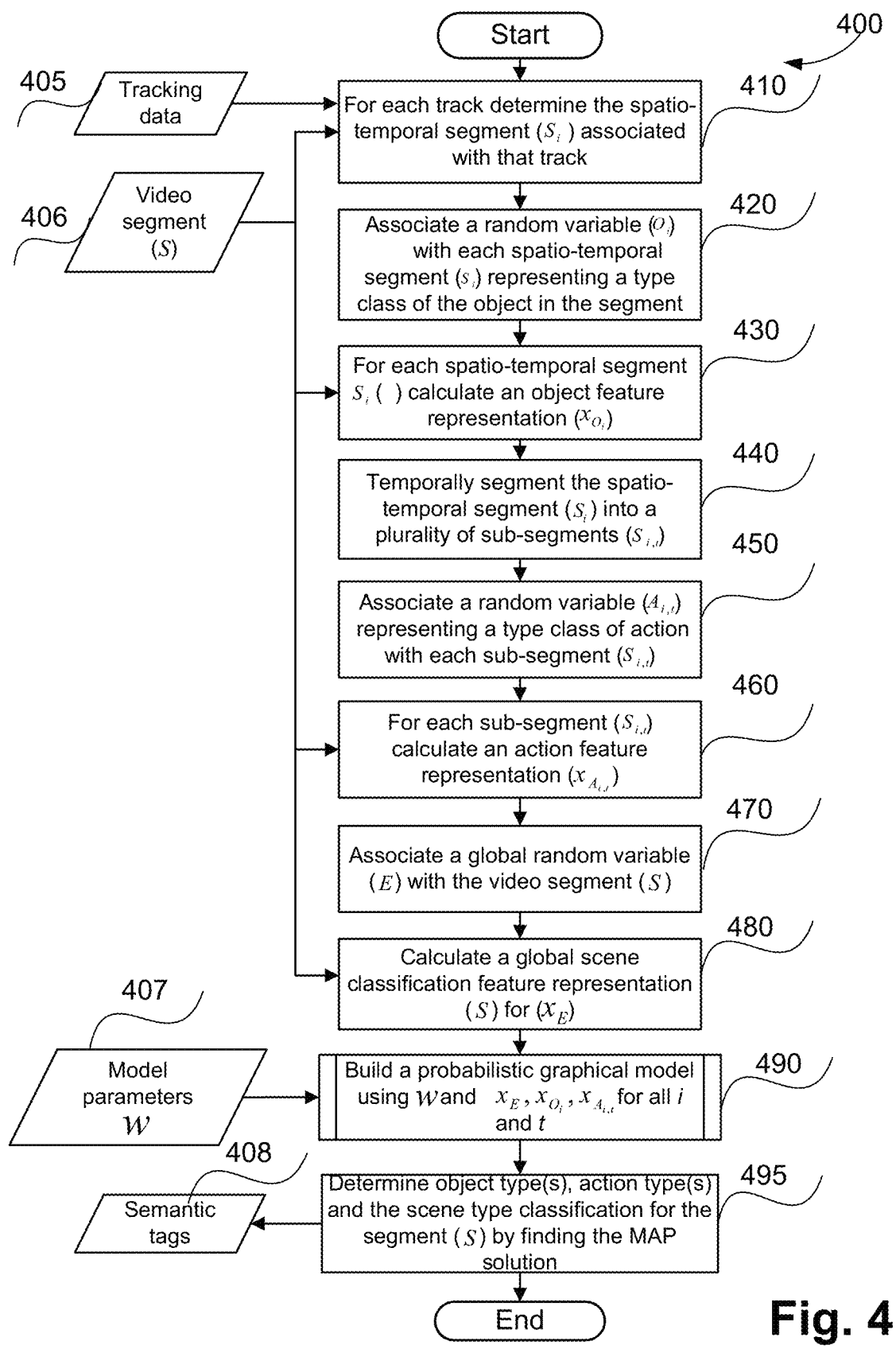
FIG. 4 is a flow diagram illustrating a method of jointly classifying static and dynamic concepts in a video segment using an efficient probabilistic graphical model according to the present disclosure.
Figure 5:
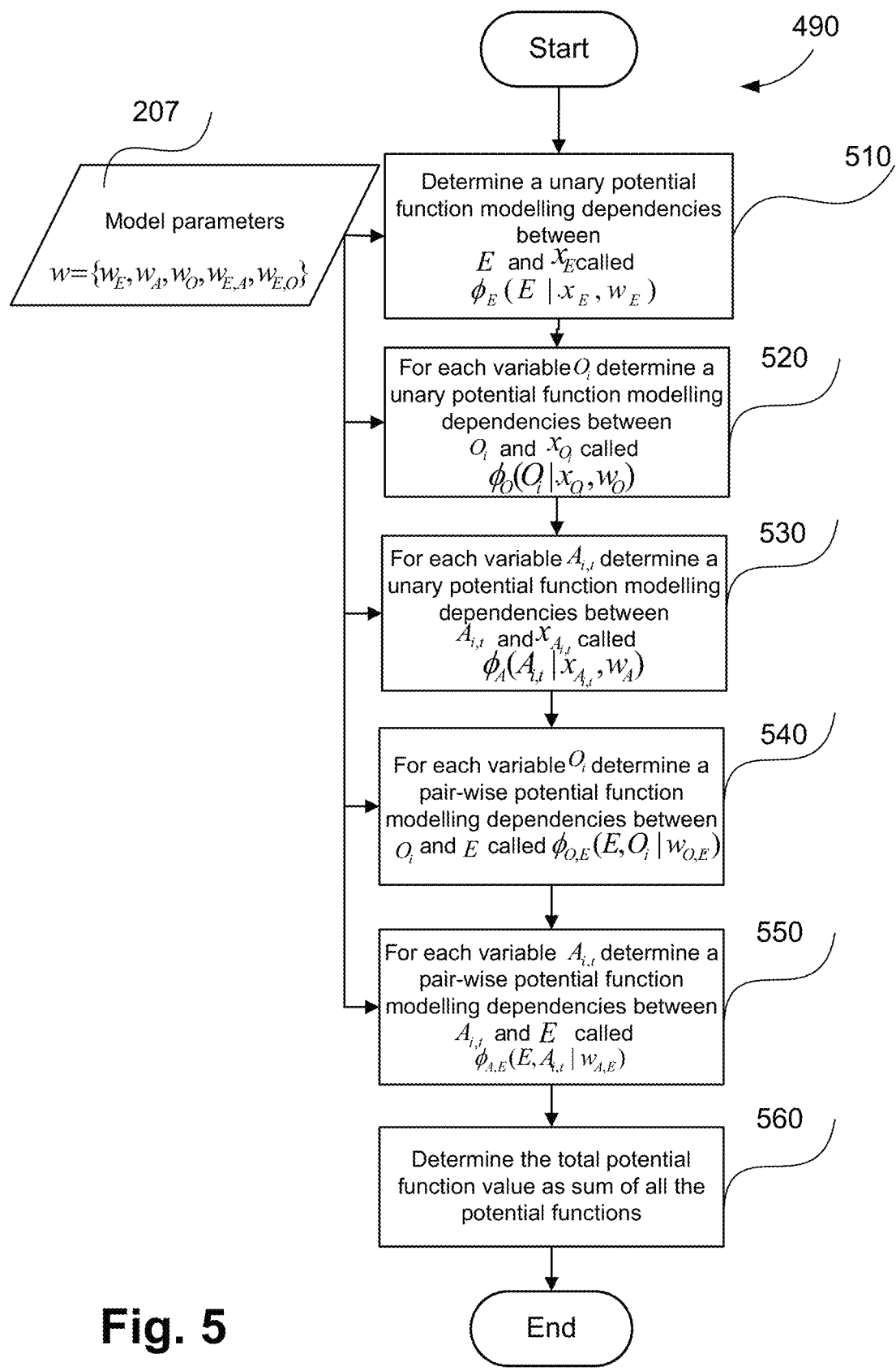
FIG. 5 is a flow diagram illustrating a method of building an efficient pair-wise probabilistic graphical model to jointly inference about static and dynamic concepts according to the present disclosure.

The method of classifying concept types may be implemented using the computer system 1300 wherein the processes of FIGS. 4 and 5, to be described, may be implemented as one or more software application programs 1333 executable within the computer system 1300. In particular, the steps of the method of FIGS. 4 and 5 are effected by instructions 1331 (see FIG. 1B) in the software 1333 that are carried out within the computer system 1300. The software instructions 1331 may be formed as one or more code modules, each for performing one or more particular tasks. The software may also be divided into two separate parts, in which a first part and the corresponding code modules performs the steps of FIGS. 4 and 5 and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for classifying concept types in video.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for classifying concept types in video.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 1B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 1A.

When the computer module 1301 is initially powered up, a power-on self-test (POST) program 1350 executes. The POST program 1350 is typically stored in a ROM 1349 of the semiconductor memory 1306 of FIG. 1A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 1A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 1A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 1B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 1A. The execution of a set of the instructions may in some cases result in output of data. Execution may also involve storing data or variables to the memory 1334.

The disclosed video processing arrangements use input variables 1354, which are stored in the memory 1334 in corresponding memory locations 1355, 1356, 1357. The video processing arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 1B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

a fetch operation, which fetches or reads an instruction 1331 from a memory location 1328, 1329, 1330;

a decode operation in which the control unit 1339 determines which instruction has been fetched; and an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 4 and 5 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The method of classifying concept types in video may alternatively be implemented in dedicated hardware such as one or more integrated circuits performing the functions or sub functions of the processes shown in FIGS. 4 and 5. Such dedicated hardware may include graphic processors, digital signal processors, or one or more microprocessors and associated memories.

Embedded Electronic Device Description

Figure 2A:
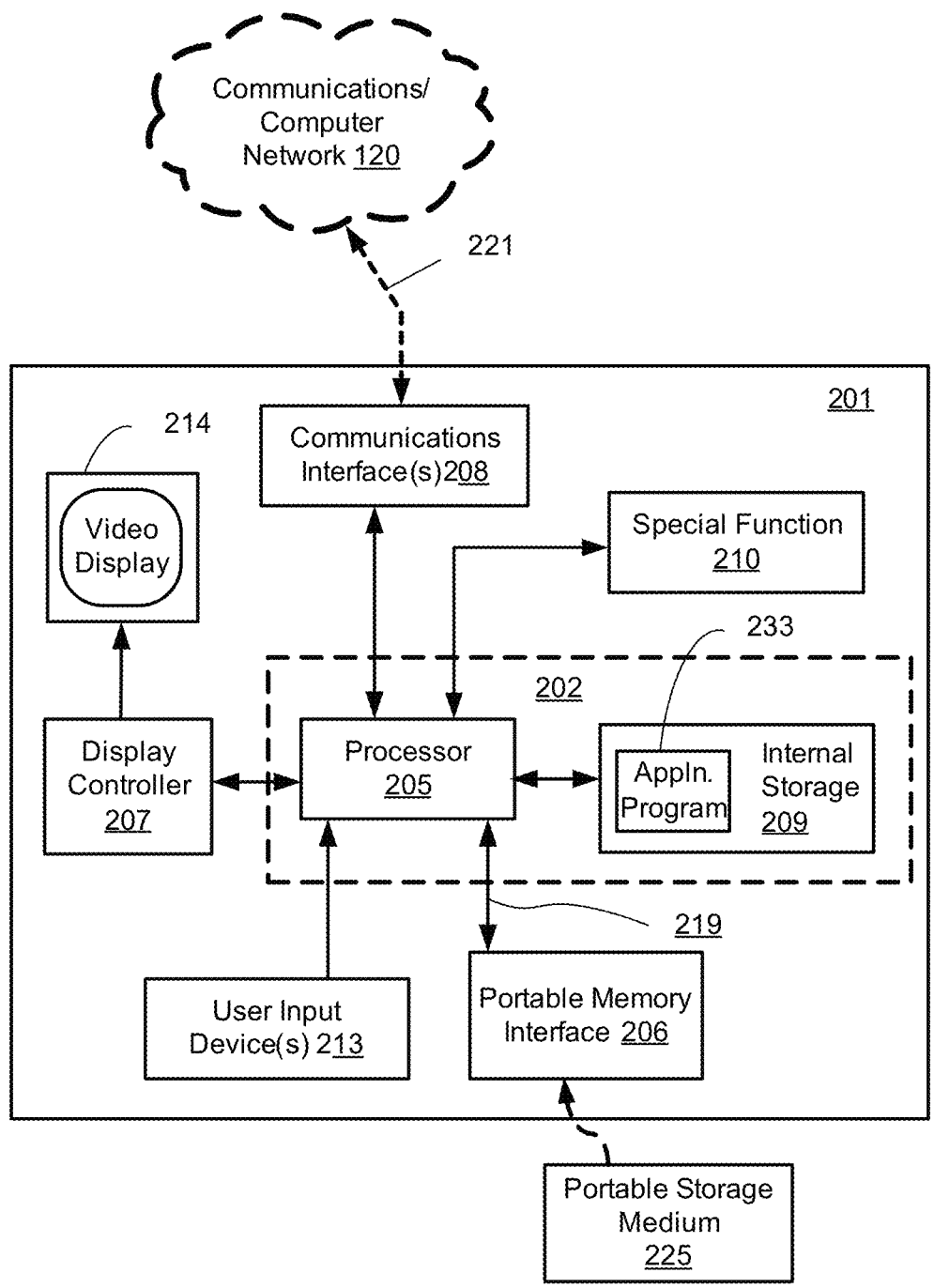
FIGS. 2A and 2B collectively form a schematic block diagram representation of an electronic device upon which described arrangements can be practised.
Figure 2B:
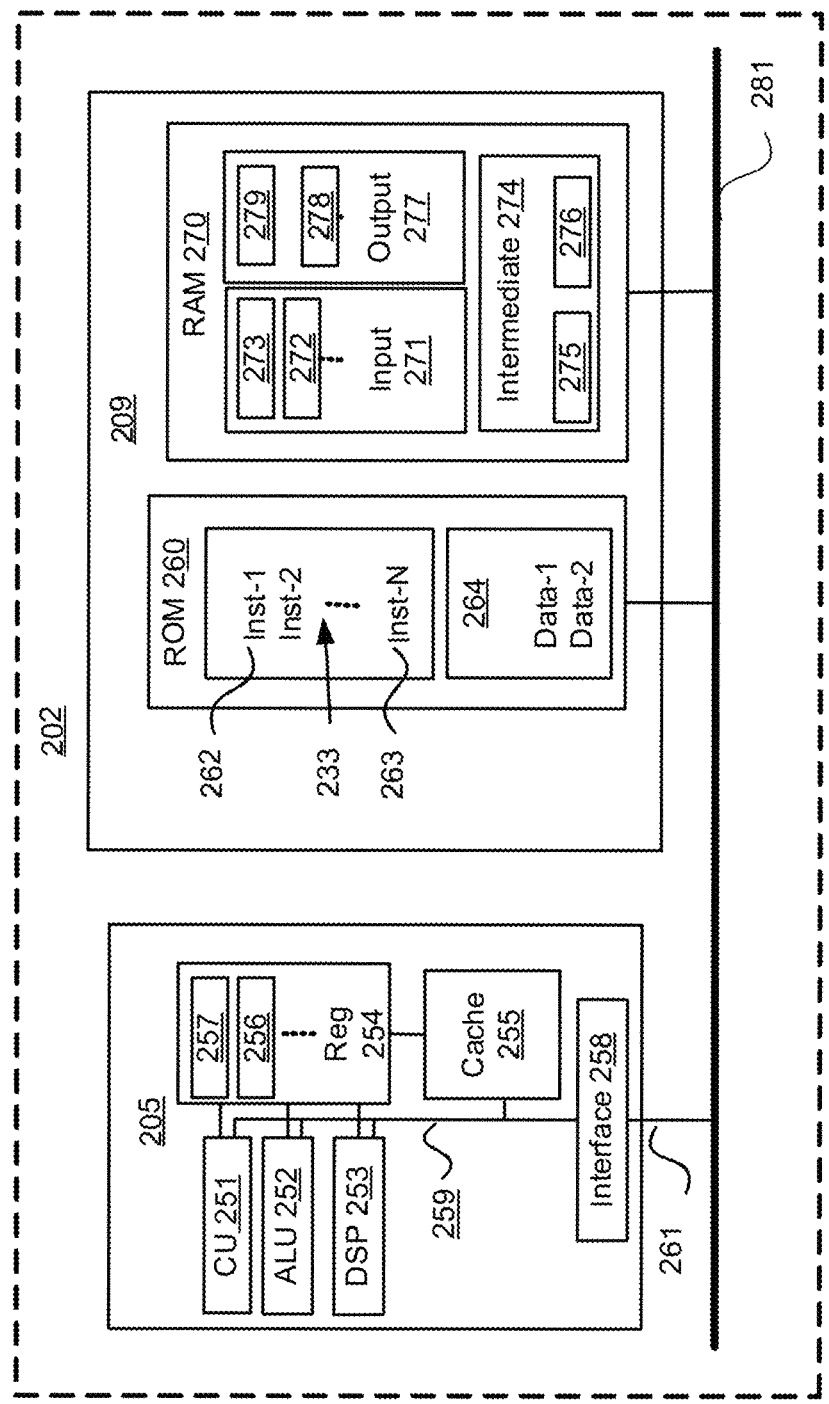

FIGS. 2A and 2B collectively form a schematic block diagram of a general purpose electronic device 201 including embedded components, upon which the video processing methods to be described are desirably practiced. The electronic device 201 may be, for example, a mobile phone, a portable media player or a digital camera, in which processing resources are limited. Nevertheless, the methods to be described may also be performed on higher-level devices such as desktop computers, server computers, and other such devices with significantly larger processing resources.

As seen in FIG. 2A, the electronic device 201 comprises an embedded controller 202. Accordingly, the electronic device 201 may be referred to as an "embedded device." In the present example, the controller 202 has a processing unit (or processor) 205 which is bi-directionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

The electronic device 201 includes a display controller 207, which is connected to a video display 214, such as a liquid crystal display (LCD) panel or the like. The display controller 207 is configured for displaying graphical images on the video display 214 in accordance with instructions received from the embedded controller 202, to which the display controller 207 is connected.

The electronic device 201 also includes user input devices 213 which are typically formed by keys, a keypad or like controls. In some implementations, the user input devices 213 may include a touch sensitive panel physically associated with the display 214 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the electronic device 201 also comprises a portable memory interface 206, which is coupled to the processor 205 via a connection 219. The portable memory interface 206 allows a complementary portable memory device 225 to be coupled to the electronic device 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 201 also has a communications interface 208 to permit coupling of the device 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 201 is configured to perform some special function. The embedded controller 202, possibly in conjunction with further special function components 210, is provided to perform that special function. For example, where the device 201 is a digital camera, the components 210 may represent a lens, focus control and image sensor of the camera. The special function components 210 are connected to the embedded controller 202. As another example, the device 201 may be a mobile telephone handset. In this instance, the components 210 may represent those components required for communications in a cellular telephone environment. Where the device 201 is a portable device, the special function components 210 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 202, where the processes of FIGS. 4 to 5 may be implemented as one or more software application programs 233 executable within the embedded controller 202. The electronic device 201 of FIG. 2A implements the described methods. In particular, with reference to FIG. 2B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the electronic device 201. However, in some instances, the application programs 233 may be supplied to the user encoded on one or more CD-ROM (not shown) and read via the portable memory interface 206 of FIG. 2A prior to storage in the internal storage module 209 or in the portable memory 225. In another alternative, the software application program 233 may be read by the processor 205 from the network 220, or loaded into the controller 202 or the portable storage medium 225 from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 201. Examples of transitory or non-tangible computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 233 and the corresponding code modules mentioned above may be executed to implement one or more graphical user interfaces (GUIs) to be rendered or otherwise represented upon the display 214 of FIG. 2A. Through manipulation of the user input device 213 (e.g., the keypad), a user of the device 201 and the application programs 233 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the electronic device 201 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processor (DSP) 253 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 through 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the electronic device 201. Typically, the application program 233 waits for events and subsequently executes the block of code associated with that event. Events may be triggered in response to input from a user, via the user input devices 213 of FIG. 2A, as detected by the processor 205. Events may also be triggered in response to other sensors and interfaces in the electronic device 201.

The execution of a set of the instructions may require numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 233, and is performed by repeated execution of a fetch-execute cycle in the processor 205 or similar programmatic operation of other independent processor blocks in the electronic device 201.

Figure 3:
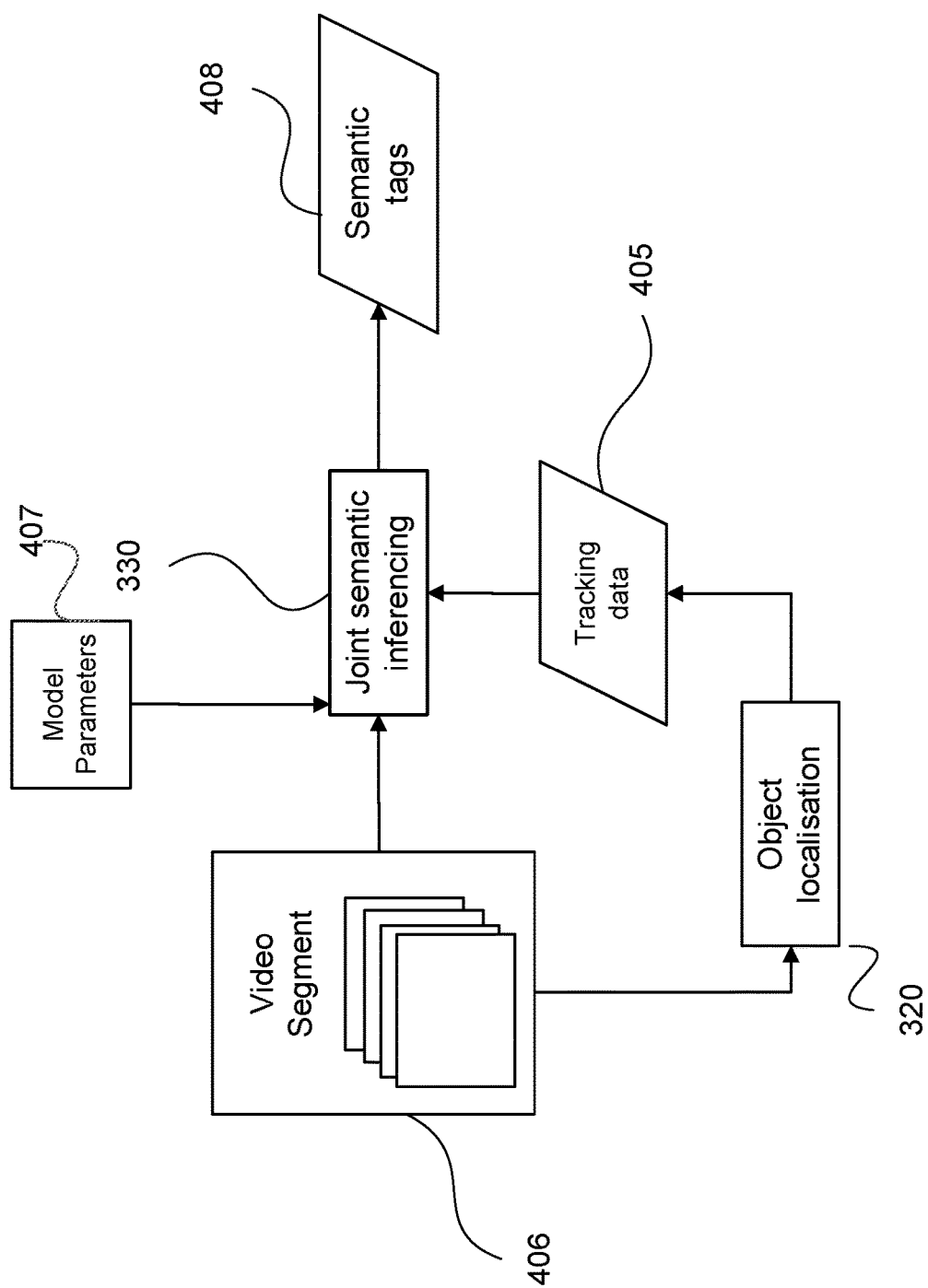
FIG. 3 is a schematic block diagram of a data processing architecture according to the present disclosure.

FIG. 3 is a schematic block diagram of a data processing architecture formed within the computing device of FIGS. 1A and 1B or the embedded electronic device of FIGS. 2A and 2B. An object localisation module 320 is arranged to process an input video segment 406 and generate localisation information in the form of tracking data 405 for objects of interest of the input video segment. The object localisation module 320 may implement a tracking algorithm which tracks objects, e.g. condensation tracking. A joint semantic inferencing module 330 is arranged to generate semantic information regarding the content of the input video segment 406 in the form of semantic tags 408 based on the tracking data. Examples of semantic tags include classification and localisation information for the objects or object parts, objects or object parts attributes such as gender and colour, classification and localisation information of the type action concept as well as classification information of the type global concept.

FIG. 4 is a schematic flow diagram of a method 400 to perform the joint semantic inferencing process carried out by the joint semantic inferencing module 330. This method enables the classification of concept types in a video to occur. The method 400 requires the objects in the video to have been localised using the object localisation module 320 prior to the execution of the method 400, e.g., by using a tracking process to generate tracking data 405 for one or more objects in a video segment. The joint semantic inferencing method 400 starts with a segmentation step 410. The segmentation step 410 uses the tracking data 405 and determines a number of objects to be tracked associated with the input video segment 406. The total number of tracked objects associated with the input video segment 406 will be represented as n. Step 410 also determines spatio-temporal segments of the input video segment 406 using the tracking data 405 and assigns a random variable, called $s_i$, to each determined spatio-temporal segment, where i is a segment index, i.e., i=1 ... n. It will be understood that the tracks for the tracked objects may be arranged in any suitable order. Each spatio-temporal segment is a sub-set of the input video segment 406 and is associated with the corresponding tracking data 405. Therefore, an object concept type in the video segment is associated with the spatio-temporal segment by generating tracking data for an object in the video segment and identifying the spatio-temporal segment based on that tracking data.

Next, an object type assignment step 420 assigns a random variable $O_i$ to each spatio-temporal segment $s_i$ determined by step 410, where i is a corresponding segment index. The value of the random variable $O_i$ (as determined by the inference step 495 and described below) represents an object concept type. For example, the random variable $O_1$, 610, represents an object concept type of a first track (track 1). In one example, the random variable $O_i$ represents a categorisation of the type of the object associated with the segment $s_i$. In alternative examples, the random variable $O_i$ may represent a part of a compound object (e.g., a wheel of a car) or may represent a static attribute of the object, such as gender, colour, or brand name of the object.

After step 420, an object feature calculation step 430 calculates a feature representation $x_{o_i}$ (620) for the segment $s_i$ such that feature representation $x_{o_i}$ may be used to determine a value of the random variable $O_i$. For example, a feature representation 620, $x_{o_1}$, may be an object (classification) feature representation of a segment $s_1$. In one example, the feature representation $x_{o_i}$ may use a bag of words (BoW) encoding of local features suitable for determination of the random variable $O_i$. In another example, a vector of locally aggregated descriptors (VLAD) encoding may be used. VLAD encoding is a first order encoding method that records the difference between the feature vectors and a cluster centre. In yet another arrangement, Fisher vector encoding (FV) may be used. Fisher vector encoding is a second order encoding method that records both the difference between the feature vectors and cluster centres (as in VLAD) and also the covariance of the feature vectors assigned to each cluster. Fisher vectors may use a Gaussian Mixture model where a cluster is modelled using a Gaussian distribution, and the feature vectors are assigned using a degree of association to a cluster according to the Gaussian distribution of the cluster.

Histogram of oriented gradient (HOG), scale invariant feature transformation (SIFT), colour histogram or features learned using a data-driven approach such as deep learning, e.g. with a convolutional neural network, are examples of local features that may be used to calculate the feature representation $x_{o_i}$.

In an alternative example, the feature representation $x_{o_i}$ may be a vector of output scores of a set of independent classifiers. In one example, a set of semantic classes may be associated with the feature representation $x_{o_i}$ which may be the same set of semantic classes that are associated with the random variable $O_i$. In an alternative example, the set of semantic classes associated with the feature representation $x_{o_i}$ may be different, though semantically related, to the set of semantic classes associated with the random variable $O_i$. For example, the set of semantic classes associated with the random variable $O_i$ and the feature representation $x_{o_i}$ may be the same set, e.g., {'person', 'music instrument', 'soccer ball'}. In another example, the set of semantic classes associated with the random variable $O_i$ may be {'person', 'music instrument', 'soccer ball'}, whereas the set of semantic classes associated with the feature representation $x_{o_i}$ may be {'man', 'woman', 'child', 'flute', 'violin', 'piano', 'guitar', 'cello', 'drum', 'soccer ball'}.

Next, a temporal segmentation step 440 segments the spatio-temporal segment $s_i$ into a plurality of temporal sub-segments, each designated as $s_{i,t}$, where t identifies a time period in the input video segment 406. Different temporal sub-segments (e.g., $s_{i,t_1}$ and $s_{i,t_2}$) may have partial temporal overlap. A time period t is an index 1, 2, ..., z, where z is the maximum number of sub-segments that the input video 406 segment is divided into. In one example, each sub-segment $s_{i,t}$ is determined by dividing a spatio-temporal segment $s_i$ into sub-segments of fixed duration d (e.g., d=30 video frames). In such an example, the maximum number of sub-segments, z, is given as the maximum over all segment indexes i, of $n(s_i)$ divided by d, $$z = \max_i \left( \frac{n(s_i)}{d} \right),$$

where $n(s_i)$ is the number of video frames in segment $s_i$. An alternative embodiment may divide each segment $s_i$ into a fixed number of sub-segments, e.g., 5 sub-segments per segment in which case z=5. In yet another example, different temporal durations may be used in different sub-segments.

After step 440, an action type assignment step 450 assigns a random variable $A_{i,t}$ to each spatio-temporal sub-segment $s_{i,t}$ as determined by step 440. For example, a random variable 630, $A_{1,1}$ is a random variable assigned to a first spatio-temporal sub-segment of a first segment $s_1$. The value of the random variable $A_{i,t}$ (as determined by the inference step 495) represents an action concept type associated with the spatio-temporal sub-segment $s_{i,t}$. In one example, the random variable $A_{i,t}$ may represent a categorisation of a type of an action that has been fully or partially captured in the spatio-temporal sub-segment $s_{i,t}$. In an alternative example, the random variable $A_{i,t}$ may represent dynamic attributes that correspond to the sub-segment $s_{i,t}$, such as pose or facial expression of a corresponding object.

Therefore, steps 440 and 450 temporally segment the spatio-temporal segment into a plurality of subsets and associate each action concept type with each subset of the plurality of subsets of the spatio-temporal segment. Although action concept types generally represent a dynamic action within the spatio-temporal segment, these steps enables each action concept type to be associated with an action that is dominant and unchanged (e.g. static) within the subset to enable the video segment to be more efficiently processed. Therefore, each dynamic concept is represented as a series of random variables, where each random variable represents the action for a short period of time where it is modelled that the action does not change in that time period.

Next, an action feature calculation step 460 calculates a feature representation $x_{A_{i,t}}$ for a spatio-temporal sub-segment $s_{i,t}$ such that $x_{A_{i,t}}$ may be used to determine the value of $A_{i,t}$. For example a feature representation 640, $x_{A_{1,1}}$ is an action feature representation of a spatio-temporal sub-segment $s_{1,1}$. In one example a feature representation $x_{A_{i,t}}$ may use a bag of words (BoW) encoding of local features suitable for determination of a value of the random variable $A_{i,t}$. In other examples, other encoding such as Fisher vector encoding (FV) or VLAD encoding may be used instead of BoW. In one example, Space-time interest points (STIP) may be used as local features for the calculation of a feature representation $x_{A_{i,t}}$. In another example, dense trajectories and motion boundary video descriptors may be used as local features for the feature representation $x_{A_{i,t}}$. In yet another arrangement, features may be learned using a data-driven approach such as deep learning, e.g. using a convolutional neural network.

In an alternative example, the feature representation $x_{A_{i,t}}$ may be a vector of scores, where each score is from an independent classifier that was trained to recognise a semantic concept. In one example, the set of semantic concepts that are used to determine the feature representation $x_{A_{i,t}}$ may be the same as the set of semantic concepts associated with the random variable $A_{i,t}$. In another example, the set of semantic concepts used to determine the feature representation $x_{A_{i,t}}$ may be different to the set of semantic concepts that correspond to possible values for the random variable $A_{i,t}$ but are relevant for determining a value of the random variable $A_{i,t}$.

Next, a global type assignment step 470 assigns a random variable 650, called E, to the input video segment 406. In one example, the random variable 650, E, represents a categorisation of the type of a scene associated with the input video 406. In an alternative example, the random variable 650, E, represents a categorisation of the type of the event which was captured in the input video 406.

Next, a global feature calculation step 480 calculates a feature representation 660, $x_E$, for the input video segment 406.

In one example, the feature representation $x_E$ may use a bag of words (BoW) encoding of local features suitable for determination of the random variable E. In another example, a vector of locally aggregated descriptors (VLAD) encoding may be used. In yet another arrangement, Fisher vector encoding (FV) may be used. Histogram of oriented gradient (HOG), scale invariant feature transformation (SIFT), colour histogram or features learned using a data-driven approach such as deep learning, e.g. with a convolutional neural network, are examples of local features that may be used to calculate the feature representation $x_E$. In an alternative example, the feature representation $x_E$ may be a vector of output scores of a set of independent classifiers, generating initial recognition scores for semantic concepts such as {'indoor', 'outdoor', 'office', 'kitchen', 'church', 'sport field', 'back yard'}.

After step 480, a probabilistic modelling step 490 builds a pair-wise conditional Markov random field (CRF model) which models the dependencies between static and dynamic concepts. In the process 400 the static concepts are represented as E and $O_i$ (where i=1, 2, ..., n and where i represent an object index), and the dynamic concepts are represented as $A_{i,t}$ (where i=1, 2, ..., n and where t=1, 2, ..., z and where t represents a time period of the input video segment 406).

After probabilistic modelling step 490, values for each of the random variables E, $O_i$ and $A_{i,t}$ are determined in an inferencing step 495 by calculating a MAP solution of the CRF model. In one example, the MAP solution may be found using belief propagation algorithm. Other examples may use other MAP inferencing algorithms such as '$\alpha$–$\beta$ swap' which is an extension of the so called 'graph-cut' algorithm to multi-state MRFs.

A discrete CRF specifies a probability distribution over a set of N discrete output random variables $Y_1, Y_2, \ldots, Y_N$ given the values of M input variables $X_1, X_2, \ldots, X_M$, using K potential functions $\psi_1, \psi_2, \ldots, \psi_K$. Each discrete random variable $Y_i$ is called an output random variable, and is associated with a set of possible states. Each potential function is associated with one or more of variables $Y_1, Y_2, \ldots, Y_N$. Each potential function $\psi_k$ specifies a non-negative value for each combination of states of the variables associated with the potential function. Variables $X_1, X_2, \ldots, X_N$ are input to the model and their values determine the values of the potential functions $\psi_1, \psi_2, \ldots, \psi_K$.

The probability distribution specified by such a CRF is given by:

$$P(Y = y \mid X = x) = \frac{1}{Z(x)} \prod_{k=1}^{K} \psi_k(Y_k = y_k \mid X_k = x_k)$$

where:
(i) Y is the set of N output random variables $Y_1, Y_2, \ldots, Y_N$, i.e. $Y=Y_1, Y_2, \ldots, Y_N$,
(ii) y is an assignment of states to output variables
(iii) X is the set of input variables $X_1, X_2, \ldots, X_M$, i.e., $X=X_1, X_2, \ldots, X_M$,
(iv) x is the value of the variables X in the current model,
(v) $P(Y=y|X=x)$ is the probability of Y having assignment y, given an assignment X=x of input variables,
(vi) Z(x) is the normalization factor and is the sum of the product of the potential functions $\psi_1, \psi_2, \ldots, \psi_K$ for all possible states of the CRF, given an assignment X=x of input variables.

A CRF probability distribution may be written in log-linear form as the exponential of sum of log-linear potential function minus log of partition function Z(x).

$$P(Y=y|X=x)=\exp(\Sigma_{k=1}^{K}\phi_k(Y_k=y_k|X_k=x_k)-\log(Z(x))) \qquad \text{Eq. (1)}$$

Where $\phi_k(Y_k=y_k|X_k=x_k)$ represents a log-linear potential function, i.e., $\phi_k(Y_k=y_k|X_k=x_k)=\log(\psi_k(Y_k=y_k|X_k=x_k))$.

In the examples described in the present disclosure, each output variable $Y_i$ is associated with a random variable such as E, $O_i$ or $A_{i,t}$ for all i and t, such that the set of output random variables $Y=\{E, O_1, \ldots, O_n, A_{1,1}, \ldots, A_{n,z}\}$. Similarly, X is the set of classification features calculated in steps 430, 460 and 480, i.e., $X=\{x_E, x_{O_1}, \ldots, x_{O_n}, x_{A_{1,1}}, \ldots, x_{A_{n,z}}\}$.

Given a set of model parameters 407, w={$w_E$, $w_A$, $w_O$, $w_{E,A}$, $w_{E,O}$}, probabilistic modelling method 490 may be used to generate a probabilistic model.

Figure 6:
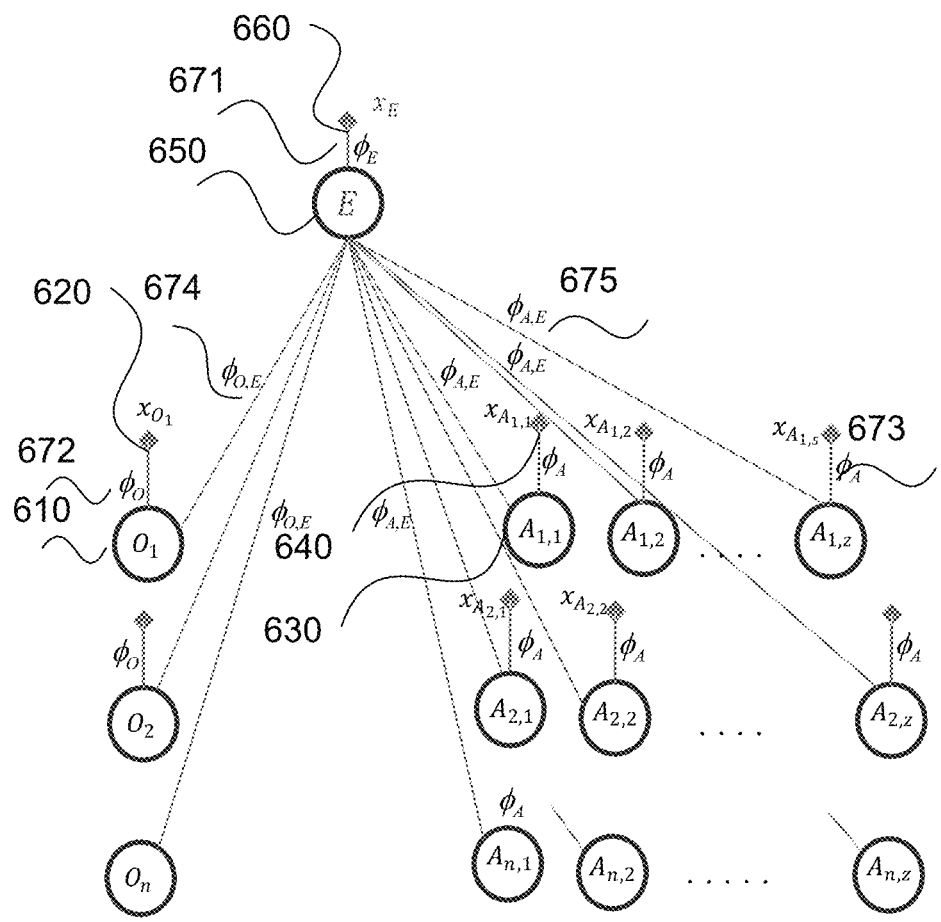
FIG. 6 is a visualisation of an exemplary graphical model for jointly classifying static and dynamic concepts in a video segment according to the present disclosure.

FIG. 5 illustrates the probabilistic modelling step 490 in more details, which will now be described in six steps. The first five steps, i.e., steps 510, 520, 530, 540 and 550 builds a CRF model using the random variables and feature representation calculated in steps 420, 430, 440, 450, 460, 470 and 480. FIG. 6 is a visualisation of a CRF model built by execution of steps 510, 520, 530, 540 and 550. In FIG. 6, random variables are represented as circular shapes, feature values are represented as filled diamonds and each line joining a pair of random variables (e.g., edges a.k.a. arcs) represents a potential function.

The probabilistic modelling method 490 starts at global unary determination step 510 which determines a unary potential function $\phi_E(E|x_E, w_E)$ (shown as 671 in FIG. 4) as the dot-product of the model parameters $w_E$ and the feature $x_E$, i.e., $\phi_E(E|x_E, w_E) = <w_E, x_E>$.

Next, an object unary determination step 520 determines a unary potential function $\phi_O(O_i|x_{o_i}, w_o)$ (672) for each variable $O_i$ as the dot-product of the model parameters $w_o$ and the feature $x_{o_i}$. The feature $x_{o_i}$ is calculated in step 430; $\phi_O(O_i|x_{o_i}, w_o) = <w_o, x_{o_i}>$. Note that the unary potential function $\phi_O$ for each variable $O_i$ uses the same set of model parameters as every other variable $O_i$, where the model parameters are denoted as $w_o$.

Next, an action unary determination step 530 determines a unary potential function $\phi_A(A_{i,t}|x_{A_{i,t}}, w_A)$ (673) for each variable $A_{i,t}$ as the dot-product of the model parameters $w_A$ and the feature $x_{A_{i,t}}$. The feature $x_{A_{i,t}}$ is calculated in step 460; $\phi_A(A_{i,t}|x_{A_{i,t}}, w_A) = <w_A, x_{A_{i,t}}>$. Note that the unary potential functions $\phi_A$ corresponding to each variable $A_{i,t}$ uses the same set of model parameters as every other variable $A_{i,t}$, where the model parameters are denoted as $w_A$.

After step 530, a global-object pair-wise potential function determination step 540 determines a pair-wise potential function $\phi_{O,E}(E, O_i|w_{O,E})$ (674) for each pair of variable E and $O_i$. $\phi_{O,E}$ is a matrix formed from model parameter values $w_{O,E}$ and models the dependencies between the categorisation value (i.e., label) of E and the categorisation value (i.e., label) of $O_i$.

Next, a global-action pair-wise potential function determination step 550 determines a pair-wise potential function $\phi_{A,E}(E, A_{i,t}|w_{A,E})$ (675) for each pair of variable E and $A_{i,t}$. $\phi_{A,E}$ is a matrix formed from model parameter values $w_{A,E}$ and models the dependencies between the categorisation value of E and the categorisation value of $A_{i,t}$. No pair-wise potential function has been defined which directly models the dependency between the state of $A_{i,t1}$ and the state of $A_{i,t2}$. However, $A_{i,t}$ variables from different time slices can indirectly influence each other through the global variable E. That is, when the value of random variable E is not observed, there is an indirect link between any two variables $A_{i,t1}$ and $A_{i,t2}$.

Next, a total potential function calculation step 560 determines an overall potential function L(Y, x, w) as the sum of all potential functions determined in step 510 i.e., $\phi_E(E|x_E, w_E)$, step 520 i.e., $\phi_O(O_i|x_{o_i}, w_o)$, $\forall i=1 \ldots n$, step 540 i.e., $\phi_{O,E}(E, O_i|w_{O,E})$, $\forall i=1 \ldots n$, step 530, i.e., ($\phi_A(A_{i,t}|x_{A_{i,t}}, w_A)$ $\forall i=1 \ldots n$, $\forall t=1 \ldots z$, and step 550, i.e., $\phi_{A,E}(E, A_{i,t}|w_{A,E})$ $\forall i=1 \ldots n$, $\forall t=1 \ldots z$.

$$\Phi(y, x, w) = \phi_E(E | x_E, w_E) + \sum_{i=1}^{n} \phi_O(O_i | x_{o_i}, w_o) +$$

$$\phi_{O,E}(E, O_i | w_{O,E}) + \sum_{i=1}^{n}\sum_{t=1}^{z} \left(\phi_A(A_{i,t} | x_{A_{i,t}}, w_A) + \phi_{A,E}(E, A_{i,t} | w_{A,E})\right)$$

To determine classification information, the inferencing step 495 uses a MAP inferencing algorithm such as belief propagation to calculate values of each variable in the set of variables Y, such that the calculated values represented as y* aim to maximise $\Phi$(Y, x, w) over possible values of Y $$y^* = \text{argmax}_y(\Phi(y,x,w)).$$

Figure 7:
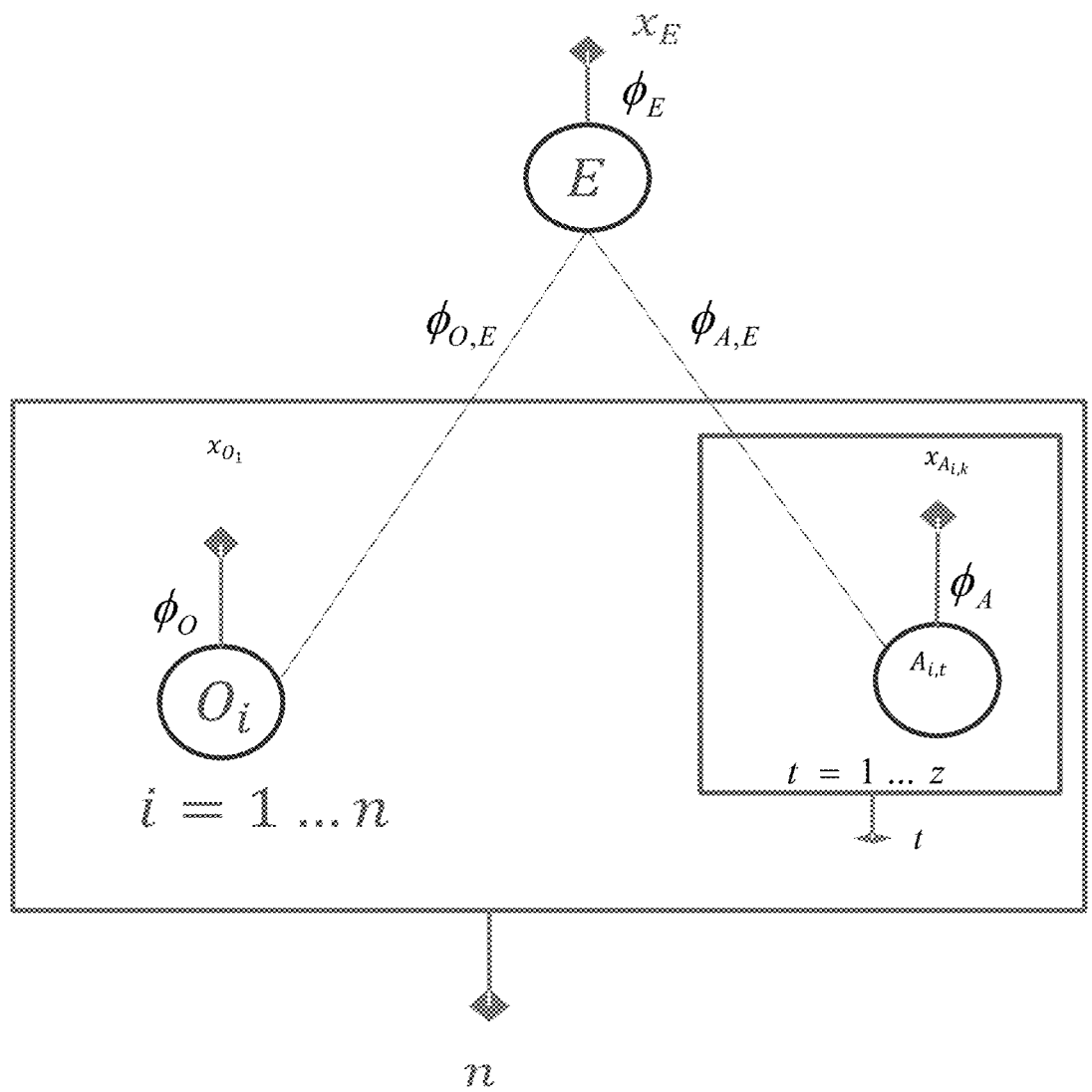
FIG. 7 is a visualisation of the graphical model of FIG. 6 using a plate notation according to the present disclosure.

Similarly, FIG. 7 is a visualisation of a CRF model built by execution of steps 510, 520, 530, 540 and 550. FIG. 7 shows a CRF model using plate model notation.

The model parameters w (407) may be determined using a training method, prior to using the probabilistic model. The training method may use a parameter optimisation technique and a training set. One example of a parameter optimisation technique is the use of a gradient descent method on the negative average log-likelihood of the ground truth classification of the training set. For a given training set $\{(y^k, x^k)\}_{k=1}^{m}$, the negative average log-likelihood function is the average of the log of CRF probability distribution represented Eq. (1).

$$l(w) = -\frac{1}{m}\left(\sum_{k=1}^{m} \Phi(y^k, x^k, w) - \log(Z(x^k))\right)$$

In this equation, m represents the number of training samples.

In other examples, a gradient descent method may be used on a negative pseudo-log-likelihood, or similarly other approximations of a log-likelihood function.

Another example may use a parameter optimisation technique to follow a maximum-margin learning method. In a maximum-margin learning method, a cost function C(w) for a training sample (y, x) may be defined as $$C(w; x, y) = \max_{\tilde{y}} \Phi(\tilde{y}, x, w) - \Phi(y, x, w) + \Delta(\tilde{y}, y)$$

where $\Delta(\tilde{y}, y)$ is a hamming loss calculated on a vector of score values from a solution to the model $\tilde{y}$, and a vector of ground truth labels y. For a given training set $\{(y^k, x^k)\}_{k=1}^{m}$, the model parameters w may be found by solving the following optimisation problem $$\min_{w} \frac{1}{2}\lambda\|w\|_2^2 + \sum_{k=1}^{m} C(w, x^k, y^k)$$

using an optimisation technique such as block-coordinate Frank-Wolfe optimisation.

The examples described in this disclosure may have an accuracy advantage over existing methods that only model dependencies between static concepts or that only use a snapshot of dynamic concepts in a time slice. The described examples may have an accuracy advantage over existing methods that only model temporal dependencies exhibited in a time sequence of a dynamic concept. An accuracy advantage may be due to the utilisation of a probabilistic graphical model that models a rich set of dependencies between static and dynamic concepts. The probabilistic modelling method 490 also may have an advantage of enabling the use of efficient inference techniques as the method 490 will produce an MRF with a tree-like graphical structure.

In one example application, a collection of video clips, e.g. from a site where consumers upload their recorded videos, is annotated to facilitate easier retrieval of the video clips. For an example video clip, a correct annotation may be {"event: soccer game", "object: human", "object: ball", "action: {kicks, run}"}. In that case, it is expected that using the inference step 495, the value of the random variable E (650) would be the number associated with the event class 'soccer game'; the value of one of the random variables $O_i$ (610) ($i \in \{1,2\}$) would be a number (e.g., '1' (one)) associated with the object class 'human' while the value of the other random variables $O_i$ would be a number (e.g., '2' (two)) associated with the object class 'ball'; and the values of the random variables $A_{1,j}$ (630) would be equal to the number associated with the action class 'kick' (e.g., '10' (ten)) for the variables associated with spatio-temporal sub-segments $S_{1,j}$ containing the action of 'kick' and the values of the random variables $A_{1,j}$ (630) would be equal to the number associated with the action class 'run' (e.g., '11' (eleven)) for the variables associated with spatio-temporal sub-segments $S_{1,j}$ containing the action of 'run'. An independent classifier, say a Support Vector Machine, provides an estimate for each of the possible annotations. For various reasons, e.g. lack of representative training data, the estimate may be wrong for one or more annotations. In the example, the possible event annotations are {'soccer game', 'birthday party', 'wedding', 'musical performance'}, and the value of $x_E$=[0.5, 0.7,0.3,0.2]; possible object annotations are {'soccer ball', 'human', 'musical instrument'} and the value of $x_{O_1}$=[0.1, 0.7, 0.5] and the value of $x_{O_2}$=[0.7, 0.5, 0.5]. The utilisation of a probabilistic graphical model which models a rich set of dependencies between static and dynamic concepts mitigates such erroneous input annotation scores. In the example, using the same input as the independent classifiers, the correction annotation may be found. A user may then easily retrieve all "soccer game" videos from a large set of videos, including "parties" and "music performances". A user can also do more specific retrieval, e.g. "soccer game" segments where the "ball" is "kicked", or a "musical performance" with a "violin", or a "wedding" with "kissing".

In another example application, a live stream of a video camera, e.g. a surveillance camera, is split into video clips, e.g. every 30 seconds or in transitions between motion and no-motion. Each video clip is then annotated and inserted into a database. A trigger may be activated upon insertion of specific annotations. E.g., when a bachelor's party group is identified as looking for a pub to patronise, a display may show a special offer to the group. Or when a group of people with baseball bats are found outside the sports field and engaged in hitting, a police intervention team may be dispatched.

The arrangements described are applicable to the computer and data processing industries and particularly for the image and video processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A method for classifying at least one concept type in a video segment, the method comprising:
   generating tracking data for objects from the video segment;
   determining spatio-temporal segments of the video segment using the tracking data;
   associating an object concept type in the video segment with each of the spatio-temporal segments of the video segment;
   temporally segmenting the spatio-temporal segments into a plurality of spatio-temporal sub-segments;
   associating one of a plurality of action concept types with each of the spatio-temporal sub-segments;
   associating a global concept type which represents a categorization of a scene of the video segment, with the video segment;
   building a model of dependencies between static and dynamic concepts, wherein the static concepts include the object concept type and the global concept type, and the dynamic concepts include the plurality of action concept types; and
   inferring values of the action concept types, the object concept type, and the global concept type associated with the video segment using the model.

2. The method of claim 1, wherein the plurality of action concept types represent a dynamic action within the spatio-temporal segment and each action concept type associated with the spatio-temporal sub-segments represents a static action within the spatio-temporal sub-segments.

3. The method of claim 1, wherein the object concept type in the video segment is associated with the spatio-temporal segment by generating tracking data for an object in the video segment and identifying the spatio-temporal segment based on the tracking data.

4. The method of claim 1, further comprising the step of calculating an object feature representation for the spatio-temporal segment, wherein the object feature representation is associated with object features of an object in the spatio-temporal segment.

5. The method of claim 4, wherein the object feature representation is calculated based on object features comprising one or more non-semantic object features.

6. The method of claim 4, wherein the object feature representation is calculated based on object features comprising one or more semantic object features.

7. The method of claim 1, further comprising the step of calculating an action feature representation associated with the action concept type, wherein the action feature representation is associated with one or more semantic concepts that are also associated with the action concept type.

8. An imaging system for classifying at least one concept type in a video segment, the imaging system comprising a processor arranged to:
   generate tracking data for objects from the video segment;
   determine spatio-temporal segments of the video segment using the tracking data;
   associate an object concept type in the video segment with each of the spatio-temporal segments;
   temporally segmenting the spatio-temporal segments into a plurality of spatio-temporal sub-segments;
   associate one of a plurality of action concept types with each of the spatio-temporal sub-segments;
   associate a global concept type which represents a categorization of a scene of the video segment, with the video segment;

build a model of dependencies between static and dynamic concepts, wherein the static concepts include the object concept type and the global concept type, and the dynamic concepts include the plurality of action concept types; and infer values of the action concept types, the object concept type and the global concept type associated with the video segment using the model.

9. The imaging system of claim 8, wherein the plurality of action concept types represent a dynamic action within the spatio-temporal segment and each action concept type associated with the spatio-temporal sub-segments represents a static action within the spatio-temporal sub-segments.

10. The imaging system of claim 8, wherein the object concept type in the video segment is associated with the spatio-temporal segment by generating tracking data for an object in the video segment and identifying the spatio-temporal segment based on the tracking data.

11. The imaging system of claim 8, wherein the processor is further arranged to calculate an object feature representation for the spatio-temporal segment, wherein the object feature representation is associated with object features of an object in the spatio-temporal segment.

12. The imaging system of claim 11, wherein the object feature representation is calculated based on object features comprising one or more non-semantic object features.

13. The imaging system of claim 11, wherein the object feature representation is calculated based on object features comprising one or more semantic object features.

14. The imaging system of claim 8 wherein the processor is further arranged to calculate an action feature representation associated with the action concept type, wherein the action feature representation is associated with one or more semantic concepts that are also associated with the action concept type.

15. A non-transitory computer readable storage medium storing program instructions for performing the method according to claim 1.

* * * * *